E., W. & O. K. NASON.

Whiffletree.

No 63,930. Patented Apr 16, 1867.

Witnesses
Wm. E. Lyon
J. W. B. Covington

Inventors:
E. W. and O. Nason
Munn & Co.
Attorneys.

United States Patent Office.

EDWARD NASON, WILLIAM NASON, AND OLIVER K. NASON, OF ORNEVILLE, MAINE.

Letters Patent No. 63,930, dated April 16, 1867; antedated April 11, 1867.

IMPROVEMENT IN DRAUGHT ATTACHMENT FOR VEHICLES.

The Schedule referred to in these Letters Patent and making part of the same.

TO ALL WHOM IT MAY CONCERN:

Be it known that we, EDWARD NASON, WILLIAM NASON, and OLIVER K. NASON, of Orneville, in the county of Piscataquis, and State of Maine, have invented a new and improved Draught Attachment for Vehicles; and we do hereby declare that the following is a full, clear, and exact description thereof, which will enable those skilled in the art to make and use the same, reference being had to the accompanying drawings, forming part of this specification, in which—

Figure 1:
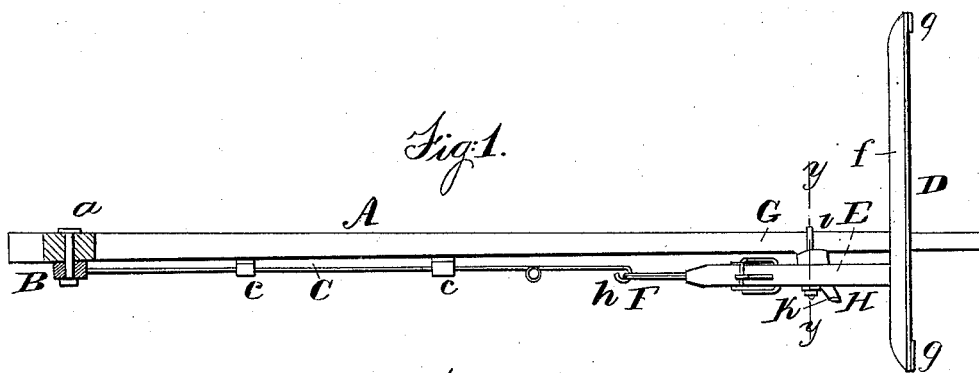
Figure 2:
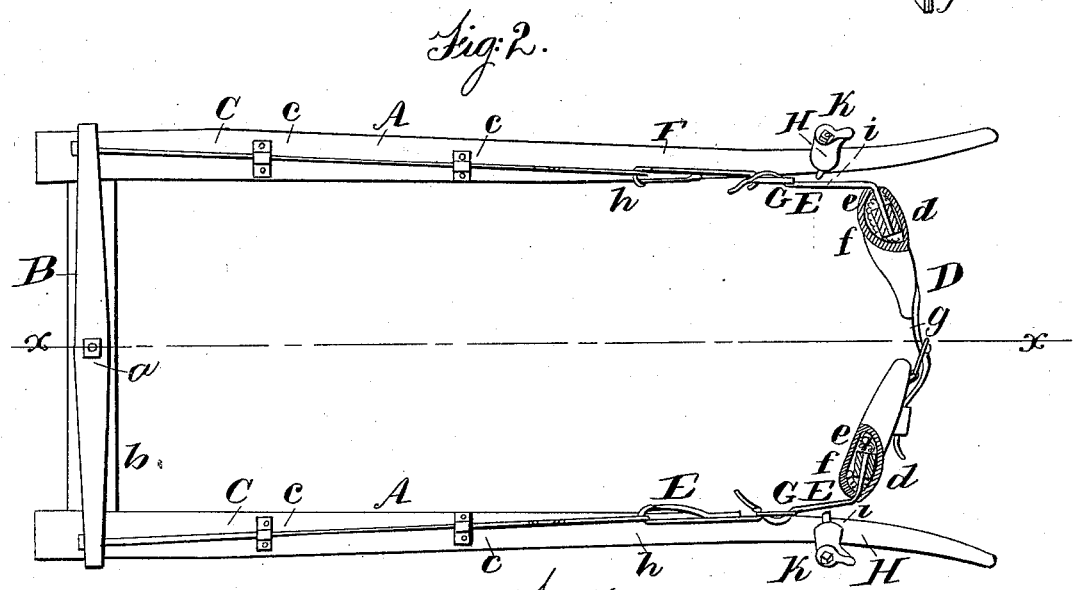

Figure 1 is a side sectional view of our invention, taken in the line $x\ x$, fig. 2.

Figure 2, an inverted plan of the same.

Figure 3:
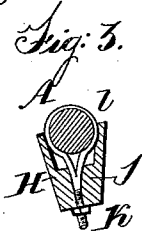

Figure 3, a section of a portion of the same, taken in the line $y\ y$, fig. 1.

Similar letters of reference indicate corresponding parts.

This invention relates to a new and useful improvement in draught attachments for vehicles, and has for its object the ready attachment of a horse to a vehicle and ready detachment therefrom, and a strong and durable construction and arrangement of parts, as hereinafter fully shown and described.

A represents a pair of thills, which may be constructed in the usual or any proper manner, and B is a whiffle-tree connected by a bolt, $a$, to the under side of the cross-bar $b$ of the thills. To each end of the whiffle-tree a rod, C, is attached, and these rods pass through guides, $c$, attached to the under sides of the thills; said guides may be of either leather or metal, and the rods are allowed to work or slide freely in them. D represents the collar, which is constructed of two wooden parts, $d\ d$, made in proper curved form, surrounded with a stuffing or filling, $e$, and covered with leather, $f$. (See fig. 2.) By this mode of construction a very economical collar is obtained, and one which will not be liable to "gall" or chafe the horse. The two parts of the collar are connected at their upper and lower ends by straps $g\ g$, or other suitable means. Each part of the collar has a strap, E, attached to it, said straps being secured to the wood portions $d\ d$. The rear ends of these straps have snap-hooks F attached to them by buckles G. These snap-hooks may be constructed in any of the known forms, and they are fitted in eyes $h$ at the front ends of the whiffle-tree rods C C.

By this arrangement it will be seen that the horse may be very readily attached to and detached from the vehicle, and a very strong and durable draught apparatus obtained: far more so than with the ordinary entire leather traces. H H represent the hold-back irons, which are secured to the thills A A by means of rings $i$ which encompass the thills, and have rods $j$ attached, which pass through the hold-back irons, and have nuts $k$ on their outer ends. By screwing up these nuts $k$ the hold-back irons are firmly secured on the thills, and they may be adjusted thereon further forward or backward, as may be required, with the greatest facility. The breeching straps are attached to the irons H, and they may be arranged in the usual or in any proper manner.

Having thus described our invention, we claim as new, and desire to secure by Letters Patent—

The arrangement of the straps E, snap-hooks F, rods C, in combination with the whiffle-tree B, and collar D, and operating in the manner and for the purpose herein specified.

EDWARD NASON,
WM. NASON,
OLIVER K. NASON.

Witnesses:
A. J. DRINKWATER,
CHARLES HOXIE.